United States Patent [19]

Morford et al.

[11] 4,155,523

[45] May 22, 1979

[54] AIRCRAFT LANDING GEAR ASSEMBLY

[76] Inventors: Earl S. Morford, 1820 Fenwick Ct., Schaumburg, Ill. 60172; Dave Heerboth, 1427 Valley Lake, #901, Schaumburg, Ill. 60195

[21] Appl. No.: 780,364

[22] Filed: Mar. 23, 1977

[51] Int. Cl.² .................. B64C 25/32; B64C 25/58
[52] U.S. Cl. ........................ 244/103 R; 188/4 R; 244/100 R; 244/102 R; 244/104 R
[58] Field of Search .......... 244/103 R, 100 R, 102 R, 244/104 R, 108, 104 FP; 188/4 R, 5

[56] References Cited

U.S. PATENT DOCUMENTS

| | | | |
|---|---|---|---|
| 1,156,633 | 10/1915 | Schroeder | 244/104 R |
| 1,812,806 | 6/1931 | Sexton | 188/5 X |
| 2,477,881 | 8/1949 | King | 244/102 R |
| 2,563,518 | 8/1951 | Dickerman | 244/104 FP X |

FOREIGN PATENT DOCUMENTS 829592  3/1960  United Kingdom .................. 188/5

*Primary Examiner*—Barry L. Kelmachter
*Attorney, Agent, or Firm*—Lockwood, Dewey, Alex & Cummings

[57] ABSTRACT

An aircraft landing gear assembly includes a strut and tire arranged for load-bearing contact with an underlying surface. A weight transfer shoe interposed between the tire and support surface at touchdown and arranged to pivot to a clear position after touchdown cushions the impact between the tire and the support surface to extend the service life of the tire.

7 Claims, 8 Drawing Figures

AIRCRAFT LANDING GEAR ASSEMBLY

BACKGROUND OF THE INVENTION

The present invention relates generally to aircraft landing gear assemblies, and more particularly to a landing gear assembly which provides improved tire service life.

Upon touchdown the tires of an aircraft are subjected to the imposition of a heavy load simultaneously with a sudden acceleration to the landing speed of the aircraft as the tires come into frictional engagement with the runway surface. As a result, the useful life of aircraft tires has been undesirably short, resulting in the need to frequently replace such tires with an attendant increase in operating costs.

While various arrangements have been proposed for reducing the weight and acceleration burdens on the tires by rotating the tires during the final phases of landing, including the provision of air vanes or electric or hydraulic motors in the wheel hubs, these arrangements have not proved satisfactory. Thus, the need has remained for a landing gear assembly wherein the life of aircraft tires is improved without undue complication or weight increases.

Accordingly, it is a general object of the present invention to provide a new and improved landing gear assembly.

It is a more specific object of the present invention to provide a landing gear assembly which provides tire service life.

SUMMARY OF THE INVENTION

The invention is directed, in an aircraft landing gear assembly of the type having a load-bearing support leg assembly and at least one tire mounted thereon for load-bearing contact with an underlying support surface, to the improvement comprising a shoe member having an energy absorbing surface, mounting means for supporting the shoe member in a first position interposed between the load-bearing surface of the tire and the support surface, and defining an operating path for the shoe member to a second position clear of the tire and support surface, and actuator means for positioning the shoe member in the first position prior to touchdown of the aircraft to at least partially absorb the energy of initial contact between the tire and support surface upon touchdown, and allowing the shoe member to move along the operating path to the second position to allow uninhibited contact between the tire and support surface following touchdown.

DESCRIPTION OF THE PREFERRED EMBODIMENT

Figure 1:
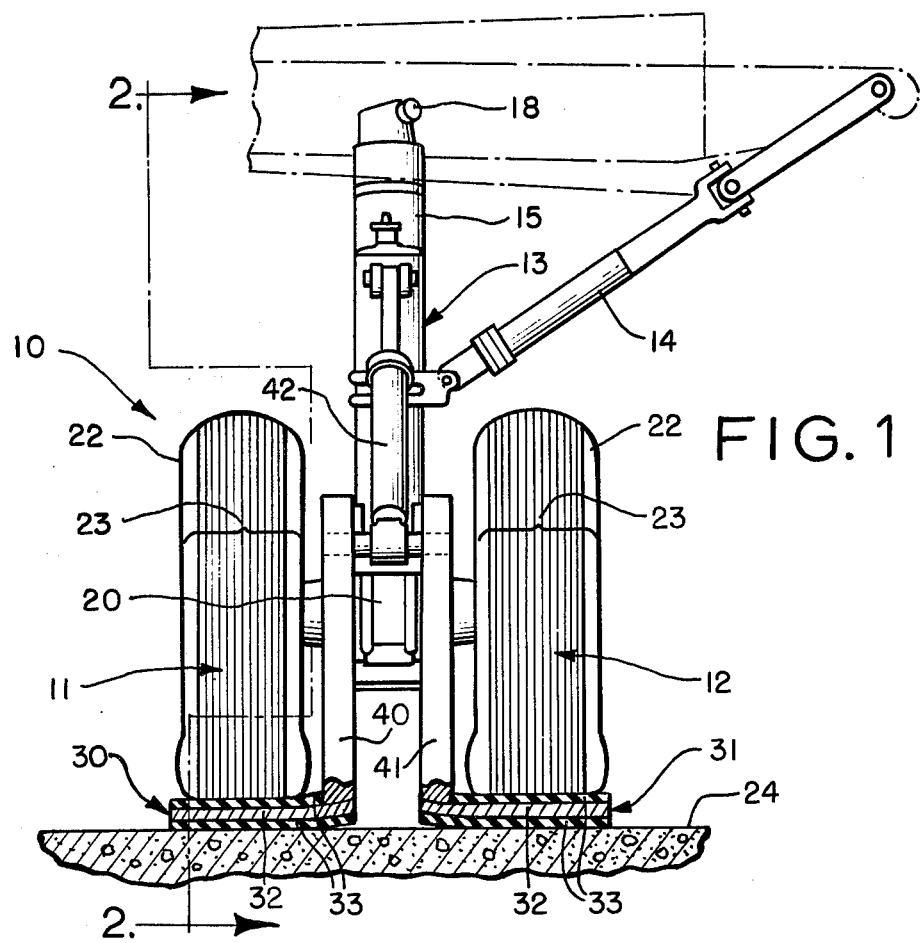
FIG. 1 is a front elevational view of a landing gear assembly constructed in accordance with the invention.
Figures 2, 3:
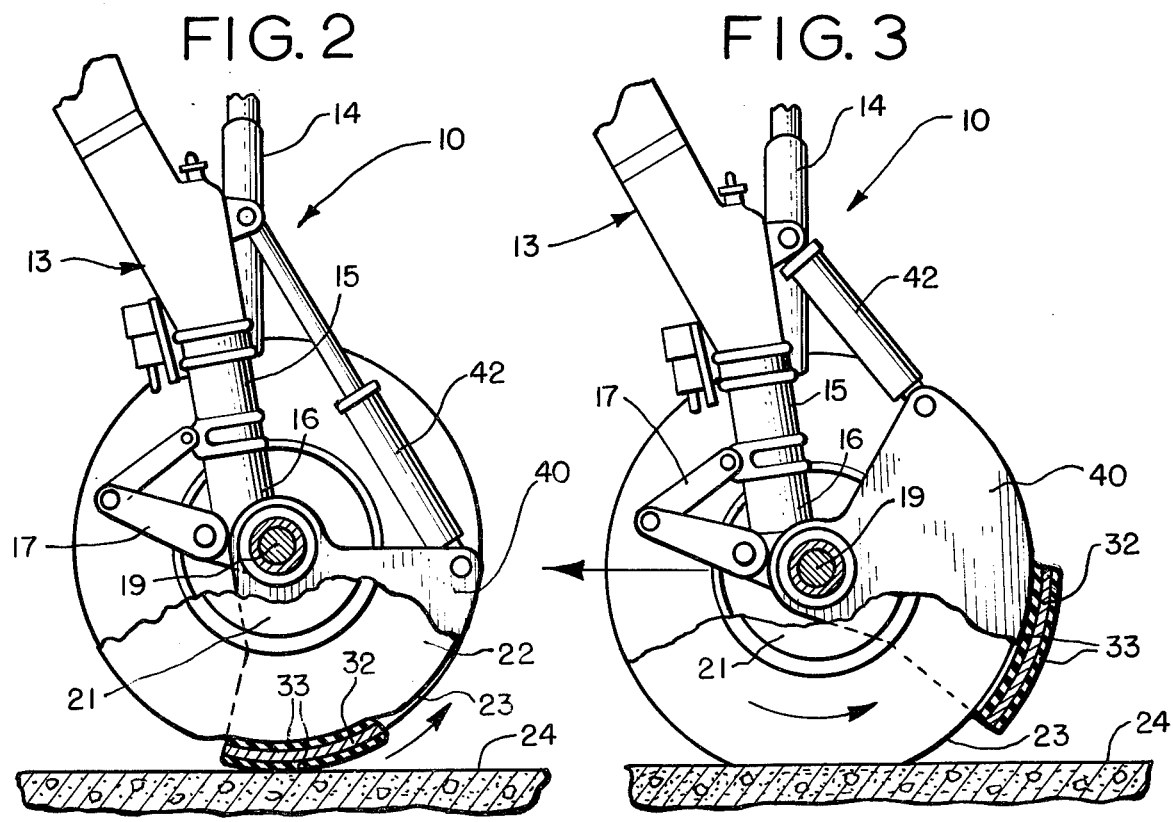
FIG. 2 is a cross-sectional view of the landing gear assembly taken along line 2—2 of FIG. 1 showing the assembly at touchdown on a runway.
FIG. 3 is a side elevational view similar to FIG. 2 showing the assembly after touchdown.

Referring to the Figures, and particularly to FIGS. 1-3, one form of aircraft landing gear assembly 10 constructed in accordance with the invention includes a pair of load-bearing tires 11 and 12, a load-bearing telescopic shock absorbing strut or support leg 13, and a diagonal locking arm 14. The telescopic strut 13 comprises the known construction of an upper component 15 and a lower component 16 connected by torque links 17. The upper component 15 is attached to the aircraft frame by means of a pivot 18 at its upper end, while the lower component 16 carries a stub axle 19 on which wheels 11 and 12 are mounted.

Wheels 11 and 12 are arranged in parallel spaced-apart relationship at the bottom end of the load-bearing strut 13 and are secured for rotation about stub shaft 19 by means of a centrally disposed hub assembly 20. In addition to rotatably supporting the wheel assemblies, hub assembly 20 contains braking and speed detection means (not shown) of conventional construction and operation for use in braking the aircraft and providing skid protection. The upper and lower components of strut 13 form in a manner well known to the art a shock absorber which cushions the aircraft during touchdown and rollout. To this end a compressible gas such as nitrogen may be provided between the two telescopic components to allow relative up and down movement with a controlled degree of resistance.

Although shown only in its extended position, it will be understood that when the landing gear assembly 10 is retracted, the entire assembly is pulled up into the aircraft wheel well (not shown) so as to free the aircraft from drag components otherwise presented by the extended gear assembly. In this respect, and as so far described, the landing gear assembly is entirely conventional in construction and operation, and therefore need not be covered in detail herein.

Wheel assemblies 11 and 12 are constructed in a conventional manner with central metallic rim portions 21 on which conventional tires 22 formed of natural or synthetic rubber are mounted. The tires are preferably filled with a compressible gas such as nitrogen and include a ribbed thread surface 23 about their circumference. It is this surface which comes into contact with the supporting runway surface 24 upon landing.

To minimize the wear upon the load-bearing thread surfaces 23 of the tires the landing gear assembly 10 incorporates, in accordance with the invention, a pair of weight transfer shoes 30 and 31 which are interposed between the load-bearing surfaces 23 and the runway surface 24 at the time of initial touchdown of the aircraft. Each of the weight transfer shoes 30 and 31 may be formed of a central rigid backing or plate member 32 on which a coating or layer 33 of energy absorbing material such as hard natural or synthetic rubber is provided.

In the embodiment of FIGS. 1-3 the weight transfer shoes 30 and 31 are cantilevered from respective mounting means in the form of respective support arms 40 and 41 pivotably mounted to stub shaft 19. Prior to landing support members 40 and 41 are rotated to a full clockwise position so as to position the cantilevered weight transfer shoes 30 and 31 under the tires. The weight transfer shoes remain in this position until the aircraft touches down, at which point the weight of the aircraft is assumed by strut 13 and wheels 11 and 12. At this instant the weight transfer pads 30 and 31 are interposed between the load-bearing surfaces 23 and the runway surface 24 so that at least a portion of the initial impact between the stationary wheels 11 and 12 and the passing runway surface 24 is absorbed by surfaces 33.

As wheels 11 and 12 begin to turn the freely pivoted support arms 40 and 41 are caused to rotate counter-clockwise to a position clear of the tire and runway surfaces, as shown in FIG. 3. As this happens, the load-bearing surfaces 23 come into unhindered contact with the runway surface 24 and the landing proceeds in a normal manner.

To provide for pre-positioning of the weight transfer shoes 30 and 31 prior to touchdown, the landing gear assembly 10 preferably incorporates actuator means in the form of a hydraulic cylinder 42 which force clockwise rotation of the support arms prior to touchdown. These cylinders may also provide a limited degree of resistance to counter-clockwise rotation of the support arms to prevent the weight transfer shoes from being prematurely moved to their retracted positions as a result of wind stream or other factors.

Figure 4:
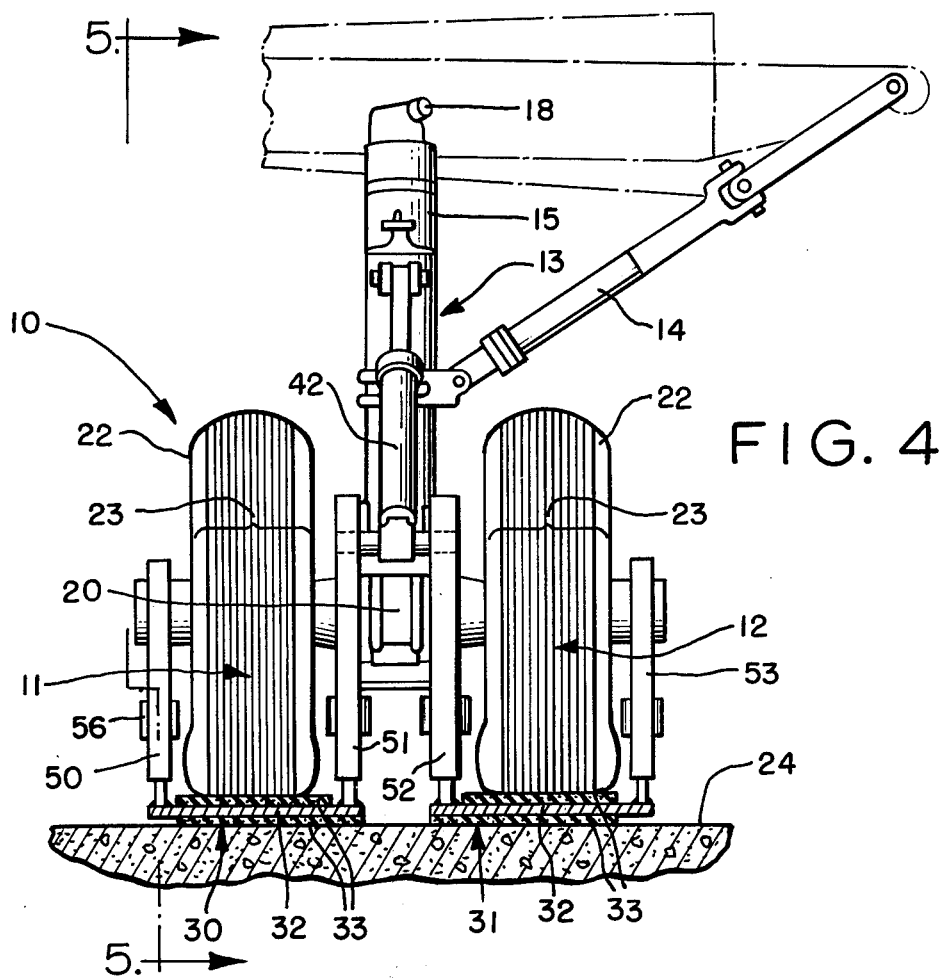
FIG. 4 is a front elevational view of an alternate embodiment of the landing gear assembly of the invention.
Figure 5:
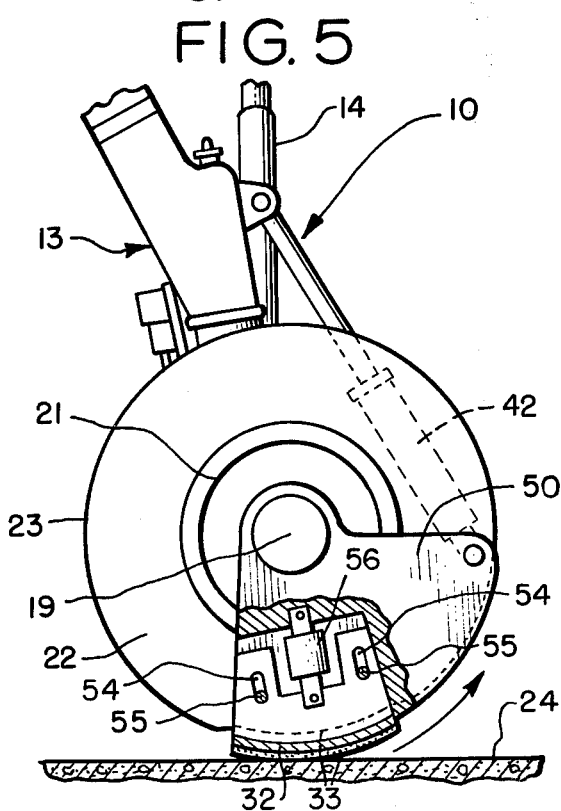
FIG. 5 is a cross-elevational view of the landing gear assembly taken along line 5—5 of FIG. 4 showing the assembly at touchdown on a runway.
Figure 6:
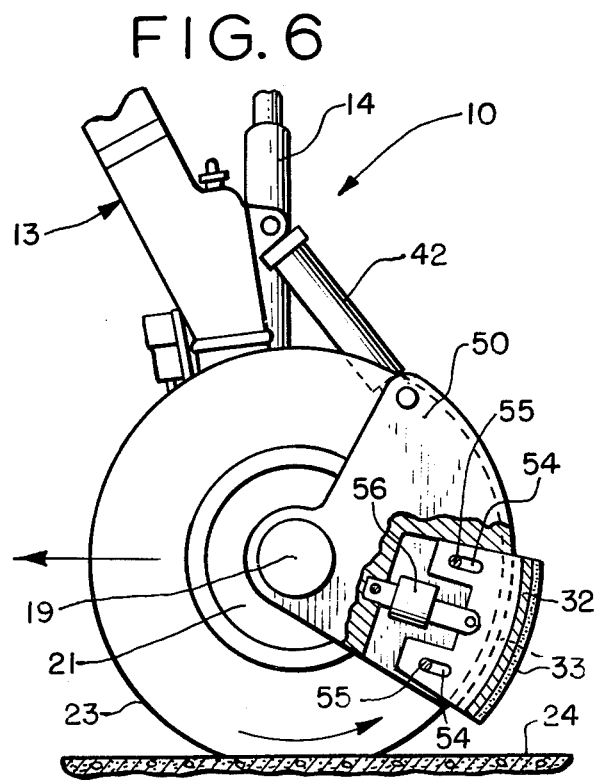
FIG. 6 is a side elevational view similar to FIG. 5 showing the assembly after touchdown.

An alternative construction for a landing gear assembly constructed in accordance with the invention is shown in FIGS. 4-6. In this embodiment the weight transfer shoes 30 and 31 are mounted by means of individual pairs of support arms 50, 51 and 52, 53 disposed on respective sides of the associated wheel. As in the embodiment of FIGS. 1-3, support members 50-53 constrain the weight transfer shoes 30 and 31 to rotation about an arcuate path about the stub shaft 19 so that upon touchdown the pads are rotated counter-clockwise to a position clear of the tire and runway surfaces. Unlike the previous embodiment wherein the weight of the aircraft was relied upon to deflect the cantilevered weight transfer shoes into engagement with thread surfaces 23, in the embodiment of FIGS. 4-6 the weight transfer shoes are mounted for radial movement with respect to stub shaft 19 to obtain clearance between the weight transfer shoes and the tire surface when the shoes are in their retracted position as shown in FIG. 6.

As best seen in FIGS. 5 and 6, the weight transfer shoes 30 and 31 are constrained to a limited radial movement by means of slots 54 and guide pins 55 which serve as attachment means between the base member 32 of the shoes and support arms 50-53. The weight transfer shoes may be radially outwardly biased by appropriate means such as a hydraulic or pneumatic cylinder 56 or by means of an appropriate compression spring to obtain separation between the shoes and the tire surface when the shoes are in their counter-clockwise retracted position, as shown in FIG. 6. Although this function could be accomplished independently of the positioning of the members 50-53 by hydraulic cylinder 42 with the weight of the aircraft being relied upon to establish contact between the tire surface 23 and the weight transfer shoes upon touchdown, it is contemplated that this function could be incorporated into the control circuitry of the support arm positioning cylinder 42.

Figure 7:
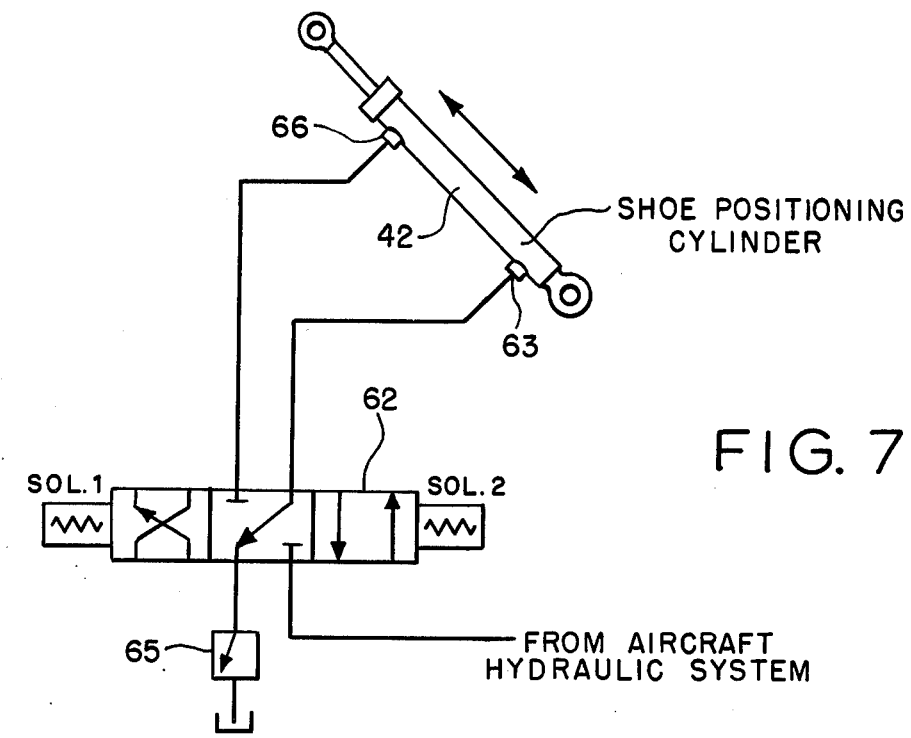
FIG. 7 is a simplified diagram of a hydraulic system for use with the landing gear assembly.
Figure 8:
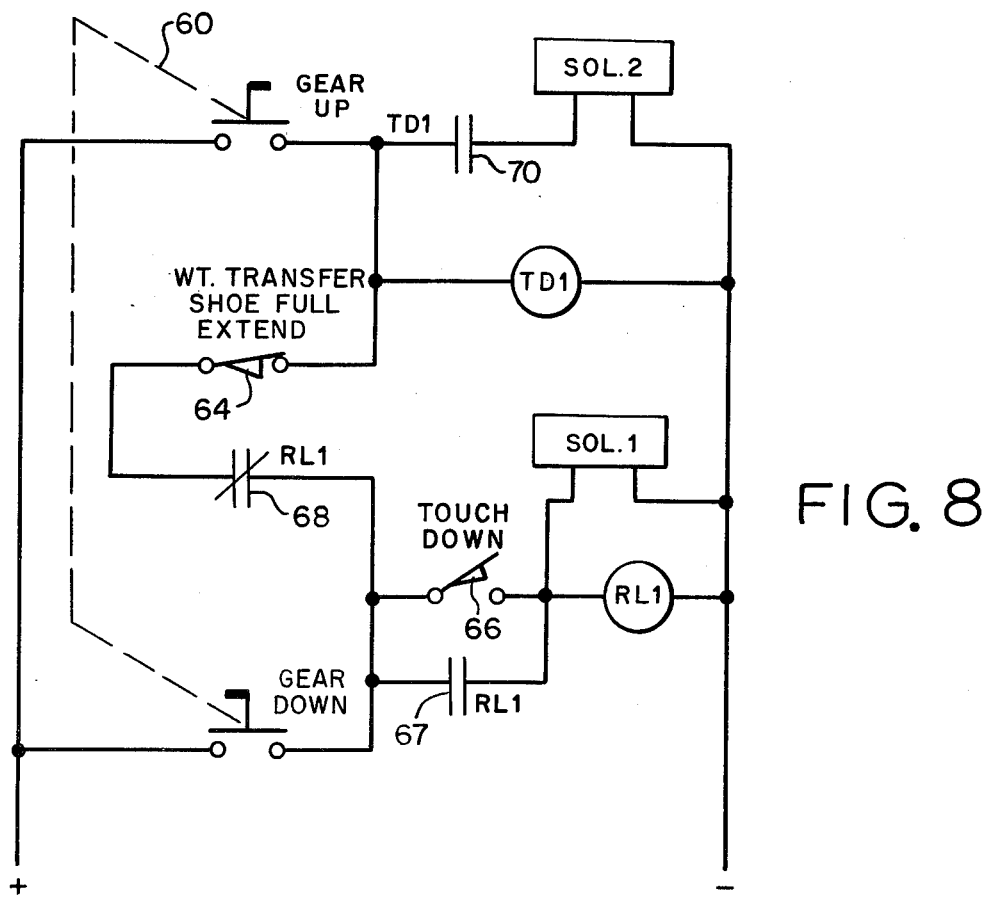
FIG. 8 is a simplified schematic diagram of an electrical circuit for use with the landing gear assembly.

Although it will be appreciated that in practice the control and actuation of the weight transfer shoe positioning cylinder 42 will be incorporated into the hydraulic system utilized for retracting the landing gear assembly 10, a simplified hydraulic system and associated electrical control circuit is shown for illustrative purposes in FIGS. 7 and 8. Referring to these Figures, upon actuation of the landing gear control switch 60 to a down position prior to landing solenoids 1 and 2 are energized to position first and second 4-port 2-position hydraulic valves 61 and 62 to apply hydraulic power to the bottom port 63 of hydraulic cylinder 42. As a result, cylinder 42 extends and causes the shoe support arms to rotate clockwise so as to position the weight transfer shoes beneath tires 22. When the shoes have reached their full clockwise extended position, the first limit switch 64 opens to remove power from solenoid 2, thereby allowing the spring-loaded hydraulic valve 62 to return to its closed position.

Upon touchdown, the weight transfer shoes are allowed to swing back in a counter-clockwise direction by reason of the pressure relief valve 65 which vents the upper port 66 of hydraulic cylinder 42. At the same time, the second limit switch 66 is actuated by weight transfer to strut 13. This energizes relay RL1 causing contacts 67 to close and contacts 68 to open. Contacts 67 serve to maintain relay RL1 and solenoid 4 energized, thereby conditioning hydraulic valve 62 to apply hydraulic power to port 63. This causes cylinder 42 to maintain the weight transfer shoes in a fully retracted position during rollout and subsequent taxiing of the aircraft. Solenoid 2 is prevented from being actuated by the initial displacement of the weight transfer shoes by the normally-open contacts 70 of time delay relay TD1, which prevent actuation of the solenoid for a short period of time following closure of limit switch 64. Once relay RL1 has been energized, contacts 68 prevent actuation of solenoid 2.

The weight transfer shoes remain in their fully retracted position until retraction of the landing gear assembly, at which time the gear down contacts of switch 60 are opened and the gear up contacts of switch 60 are closed. Solenoid 1 is now energized to reposition hydraulic valve 61 and solenoid 2 is actuated through the normally-open contacts of time delay relay TD1 and a third normally-closed limit switch 71 to position valves 61 and 62 so as to supply hydraulic power to port 63 to re-extend the weight transfer shoes. The shoes remain extended until subsequent landing and touchdown, at which time the shoes are again retracted as previously described.

While the invention has been shown in conjunction with a retractable heavy-duty landing gear assembly of a type suitable for use with commercial air transport aircraft, it will be appreciated that the invention can be utilized in conjunction with light aircraft as well. For example, it would be possible to provide a simplified positioning arrangement in conjunction with a single tire in either a fixed or retractable landing gear assembly.

While embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

We claim:

1. In an aircraft landing gear assembly of the type having a load-bearing support leg assembly and tire rotatably mounted thereon for load-bearing contact with an underlying support surface, said tire being rotated upon touchdown of the aircraft on the support surface, the improvement comprising:

a shoe member having an energy absorbing suface;

mounting means for supporting said shoe member in a first position interposed between the load-bearing surface of said tire and said support surface, and defining a generally arcuate operating path for said shoe member in the direction of rotation of said tire to a second position clear of said support surface, said shoe member being mounted for substantially radial movement with respect to the axis of rotation of said tire so as to engage said tire while in said first position and being urged along said operating path to said second position by rotation of said tire; and actuator means for positioning said shoe member in said first position prior to touchdown of the aircraft whereby at least a portion of the energy dissipated upon initial contact between said landing gear assembly and said support surface at touchdown is absorbed by said shoe member prior to moving along said operating path to said second position.

2. An aircraft landing gear assembly as defined in claim 1 wherein said energy absorbing surface comprises a hard rubber-like material.

3. An aircraft landing gear assembly as defined in claim 1 wherein said tire is carried on said support leg assembly for up and down shock-absorbing movement, and said shoe member is supported for up and down movement with said tire.

4. An aircraft landing gear assembly as defined in claim 3 wherein said load-bearing support leg assembly includes an upper component connected to the aircraft and a lower component carrying said tire movable upwardly and downwardly with respect to the upper component when the leg assembly is in an upright operative position, and wherein said shoe member is mounted for movement with said lower component.

5. An aircraft landing gear assembly as defined in claim 1 wherein said shoe member is outwardly biased with respect to said axis of rotation so as to allow free rotation of said tire when in said second position.

6. An aircraft landing gear assembly comprising, in combination:

a load-bearing support leg assembly;

a tire rotatably mounted on said support leg assembly for up and down shock-absorbing movement and load-bearing contact with an underlying support surface, said tire being rotated upon touchdown of the aircraft on the support surface;

a shoe member having an energy absorbing suface;

mounting means for supporting said shoe member in a first position interposed between the load-bearing surface of said tire and said support surface, and defining a generally arcuate operating path for said shoe member in the direction of rotation of said tire to a second position clear of said support surface, said shoe member being supported for up and down movement with said tire, and being mounted for substantially radial movement with respect to the axis of rotation of said tire so as to engage the load bearing surface of said tire while in said first position and be urged along said operating path to said second position by rotation of said tire, and outwardly biased therefrom so as to allow free rotation of said tire when in said second position; and actuator means for postioning said shoe member in said first position prior to touchdown of the aircraft whereby at least a portion of the energy dissipated upon initial contact between said landing gear assembly and said support surface at touchdown is absorbed by said shoe member prior to moving along said operating path to said second position.

7. An aircraft landing gear assembly as defined in claim 6 wherein said energy absorbing suface comprises a hard rubber-like material.

* * * * *